AUTOMATIC RING THRU SYSTEM

Filed Oct. 30, 1962 2 Sheets-Sheet 1

INVENTORS
EDWARD G. TUTHILL
RAY C. FULLER
BY
Moody and Kintzinger
ATTORNEYS

AUTOMATIC RING THRU SYSTEM

Filed Oct. 30, 1962

2 Sheets-Sheet 2

INVENTORS
EDWARD G. TUTHILL
RAY C. FULLER

BY Woody and Kintzinger
ATTORNEYS 3,204,045

AUTOMATIC RING THRU SYSTEM

Edward G. Tuthill, Marion, and Ray C. Fuller, Cedar Rapids, Iowa, assignors to Collins Radio Company, Cedar Rapids, Iowa, a corporation of Iowa Filed Oct. 30, 1962, Ser. No. 234,064
12 Claims. (Cl. 179—41)

Figure 1:
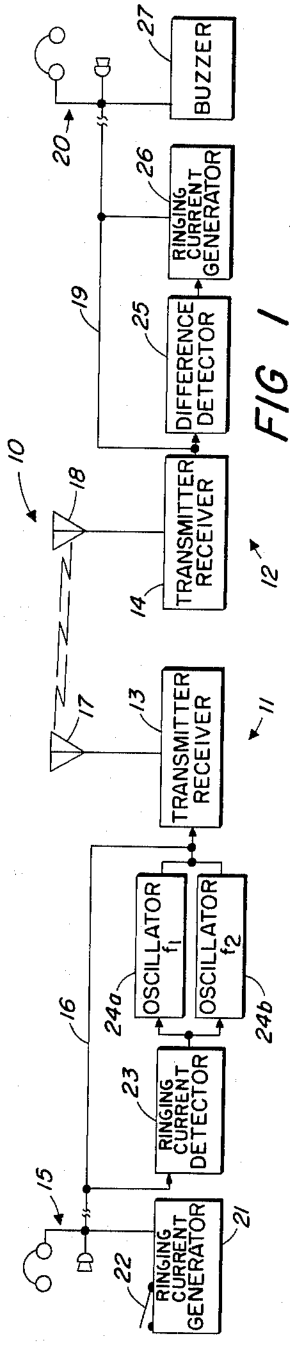

This invention relates in general to automatic ring thru systems for communication networks, and in particular to a two-tone ringing system actuated by an operator on a field telephone several miles from a communication center for automatically ringing another operator also on a field telephone several miles displaced from a different communication center.

Many communication systems are operated on a "general call" basis with bells of many receiving telephones being simultaneously actuated, even though the message to be transmitted is intended for one receiving phone only. Thus, by such a system, unnecessary and unwanted rings are heard by a large group of personnel, and with only a relatively small number of the rings being for any one particular receiving telephone. This dulls the reactions of listening personnel and results in missed calls, and many times, on the other hand, attracting personnel to receiving telephones for which the call is not intended.

Radio links between various communication centers have audio modulated R.F. signals (including single sideband operation) which are affected by drifting R.F. frequencies. This gives rise to faulty operation with single tone ringing systems with the audio signal being shifted in frequency. Single tone ringing systems are also susceptible to actuation by speech and noise present in the output of a radio receiver.

It is, therefore, a principal object of this invention to provide a two-tone ringing system for allowing an operator on a field telephone several miles from a communication center to automatically ring another operator also on a field telephone several miles displaced from a different communication center.

Another object is a two-tone communication ring thru system free from the effect of drifting R.F. frequencies on transmitted audio signals.

A further object is to provide a two-tone ring thru system not subject to actuation by an audio input frequency close to the known difference frequency of the two tones, and for noise suppression through and below the level of a frequency equal to the difference frequency.

Features of this invention useful in accomplishing the above objects includes an operator actuated ringing current generator, and a communication center having a ringing current detector, two oscillators tuned to different audio frequencies, a telephone system, a transmitter-receiver for transmitting the tones of the two oscillators and messages transmitted and received for the telephone system, and an antenna. An associated communication center likewise has an antenna, a transmitter-receiver, a receiving and transmitting telephone system, a frequency difference detector for detecting the difference between the tones of the two oscillators in the detected audio of the transmitter-receiver, a ringing current generator subject to actuation when the difference detector receives the tones of the two oscillators, and a buzzer subject to actuation by the ringing current generator.

Specific embodiments representing what are regarded as the best modes of carrying out the invention are illustrated in the accompanying drawings.

Figure 2:
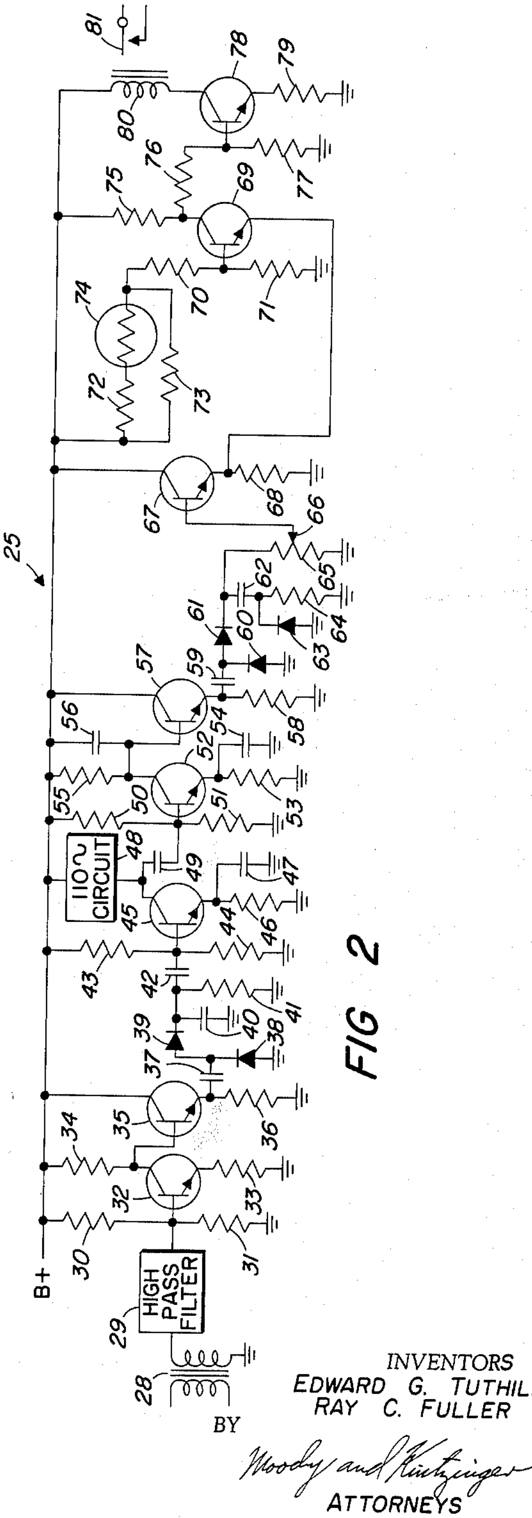
Figure 3:
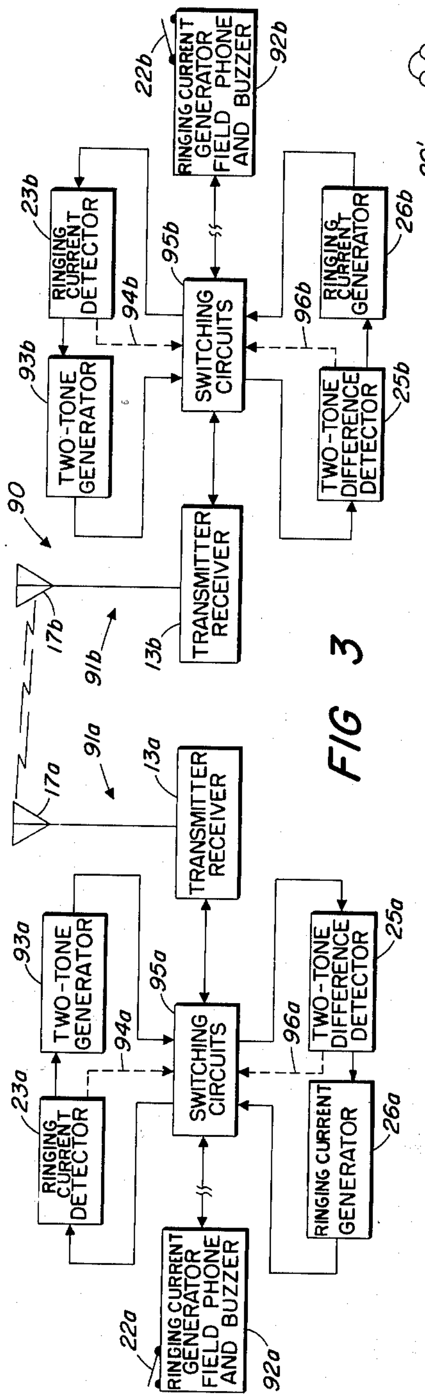
Figure 4:
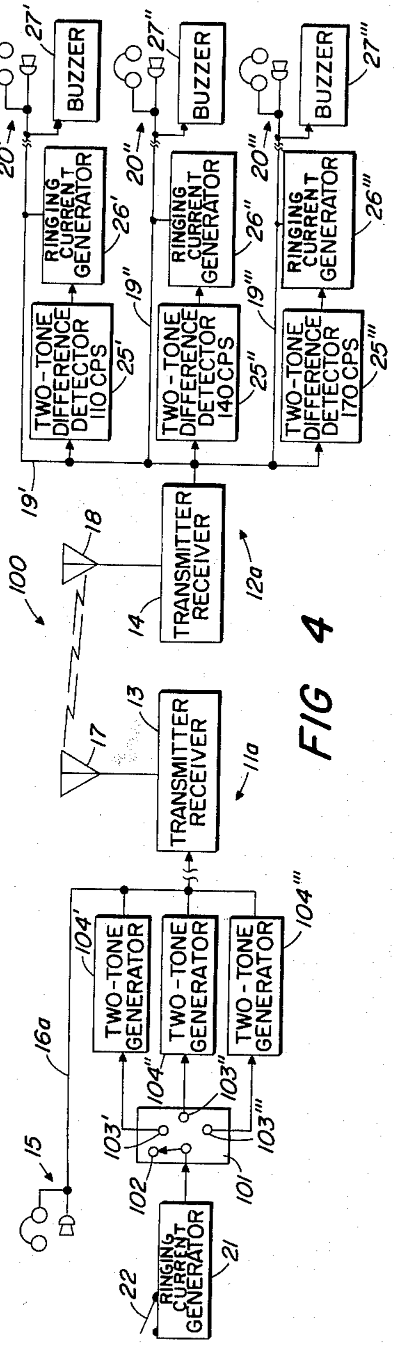

In the drawings:

FIGURE 1 represents a two-tone ring thru system for use with a field telephone connected to, and remotely located, for example, several miles from, one radio communication center, and another radio communication center equipped with a field telephone connected to, and located at a remote displaced position from, the second communication center;

FIGURE 2, a detailed circuit diagram of the two-tone frequency signal difference detector portion of the ring thru system of FIGURE 1;

FIGURE 3, a block diagram of two radio transmitter-receiver communication centers, each having a remotely located field telephone equipped with a ringing current generator and a buzzer in a two-tone ring thru system that can be actuated from either field telephone for ringing the field telephone of the opposite communication center; and FIGURE 4, a ring thru system for two radio transmitter-receiver communication centers with a remotely located field telephone of one communication center being equipped with a ringing current generator and a system for selectively ringing various remotely located field telephones of the other communication center.

Referring to the drawings:

The communication system 10 of FIGURE 1 is shown to have two communication centers 11 and 12, equipped with radio transmitter-receivers 13 and 14, respectively. Field telephone 15, remotely located from communication center 11, is connected through audio line 16 to transmitter-receiver 13. Radio frequency signals are transmitted from and received by antenna 17 of communication center 11. Signals transmitted from antenna 17 are received by antenna 18 of communication center 12, and signals emanating from antenna 18 are received by antenna 17. Audio line 19 connects remotely located field telephone 20 for transmission of audio signals to the field telephone from the transmitter-receiver 14, and for feeding an audio input from the field telephone 20 to the transmitter receiver 14.

The communication system 10 is shown to also include a selectively operated automatic ring thru system. This ring thru system includes a ringing current generator 21 located with field telephone 15 and having a manually operated switch 22 (or plunger). Ringing current generator 21 of conventional construction is connected to a ringing current detector 23 of conventional construction located at communication center 11. Ringing current detector 23, when actuated, provides the signal for activating two oscillators 24$a$ and 24$b$, of conventional construction, tuned to different frequencies $f_1$ and $f_2$, respectively. The oscillators 24$a$ and 24$b$ are connected for application of their output signals $f_1$ and $f_2$ as inputs to transmitter-receiver 13. In transmitter-receiver 13 the oscillator signals are modulated on an R.F. frequency, transmitted by antenna 17, and when received by antenna 18 the oscillator signals are demodulated in transmitter-receiver 14. The demodulated signals $f_1$ and $f_2$ of the two oscillators are fed as a two-tone input to frequency signal difference detector 25. When the frequency signal difference detector 25 receives the two oscillator tones of communication center 11, it provides a detected frequency difference and rectified output applied to ringing current generator 26 which in turn provides a signal through a line for activating ringer or buzzer 27 at the remotely located field telephone 20.

Referring also to FIGURE 2, the frequency signal difference detector 25 is shown to be provided with a signal input coupling transformer 28, the output of which is connected to a high-pass filter 29. The output of highpass filter 29 is connected to the junction of a pair of resistors 30 and 31, serially connected between B+ and ground, and also as the input to the base of transistor 32. The emitter of transistor signal amplifier 32 is connected through resistor 33 to ground. The collector of transistor 32 is connected both through resistor 34 to B+ and as a signal path directly to the base of transistor 35. The collector of impedance matching transistor 35 is connected to B+ supply. The emitter is both connected through resistor 36 to ground and through capacitor 37 to the junction of diodes 38 and 39. The anode of diode 38 is connected to ground and the cathode to the anode of diode 39. The cathode of diode 39 is connected to ground through capacitor 40 and resistor 41, in parallel, and also through capacitor 42 to both the junction of resistors 43 and 44 and the base of transistor 45. At this point it might be remarked that the primary purpose of diode 38 to ground is for mixing while the series diode 39 is for envelope detection. The capacitor 40 to ground is so chosen as to present a low A.C. impedance to ground, for an audio frequency range, for example, above 1000 c.p.s. The output of this circuitry, as applied to the base of transistor 45, should include only the difference of the two oscillator tones generated by oscillators 24*a* and 24*b*.

The emitter of transistor 45 is connected through resistor 46 and capacitor 47, in parallel, to ground. A tuned circuit 48 is connected between B+ supply and the collector of transistor 45 to peak the desired predetermined frequency and discriminate against all other frequencies. The collector of transistor 45 is also connected through capacitor 49 to the junction of resistors 50 and 51, serially connected between B+ and ground, and also as a signal path to the base of signal amplifying transistor 52. The emitter of transistor 52 is connected through resistor 53 and capacitor 54, in parallel, to ground. The collector is connected through resistor 55 and capacitor 56, in parallel, to the B+ supply and also to the base of impedance matching transistor 57. The collector of transistor 57 is connected to B+ and the emitter is connected both through resistor 58 to ground and through capacitor 59 to the junction of diodes 60 and 61. The anode of diode 60 is connected to ground and its cathode to the anode of diode 61. The cathode of diode 61 is connected serially through capacitor 62 and diode 63 in parallel with resistor 64 to ground. The cathode of diode 61 is also connected through adjustable potentiometer 65 to ground. The diode circuitry from the emitter of transistor 57 to potentiometer 65 is for conversion of a frequency signal equal to the tuned frequency of circuit 48 and equal to the difference of the two oscillator tones, to D.C. The capacitor 62, resistor 64, and diode 63 network help integrate out noise.

The adjustable tap 66 of potentiometer 65 is connected to the base of signal amplifying transistor 67. The collector of transistor 67 is connected to B+ and the emitter is connected both through resistor 68 to ground and to the emitter of transistor 69. The base of transistor 69 is connected to the junction of resistors 70 and 71 of a resistance network connected between B+ and ground and also including resistors 72, 73, and thermistor 74. The collector of transistor 69 is connected through resistor 75 to B+ and serially through resistors 76 and 77 to ground. The junction of resistors 76 and 77 is connected to transistor 78. The emitter of transistor 78 is connected through resistor 79 to ground, and the collector of transistor 78 is connected through relay coil 80 to B+. Relay coil 80 when energized closes relay contact 81 for activating ringing current generator 26.

In operation oscillators 24*a* and 24*b* could be tuned to audio frequencies, for example, of $f_1$ equal to 1090 c.p.s. and $f_2$ equal to 1200 c.p.s., respectively, in order that these two audio frequencies will be fed to transmitter-receiver 13 whenever the operator at field telephone 15 manually closes switch 22 of ringing current generator 21. When these frequencies are received and demodulated by transmitter-receiver 14 and pass to the frequency signal difference detector 25, only those frequencies above, for example 1000 c.p.s., are passed by high-pass filter 29. This prevents frequencies close to the difference frequency between oscillators 24*a* and 24*b* from actuating the buzzer system which otherwise could be troublesome, since the signal difference frequency is low in the audio range blocked, well below 1000 c.p.s. Within the frequency signal difference detector 25 the frequency difference between the two oscillator frequencies $f_1$ and $f_2$ is detected by the combination of diodes 38 and 39. Those audio frequencies remaining, for example, above 1000 c.p.s., are shorted out to ground through the relatively low A.C. impedance of capacitor 40 for frequencies above 1000 c.p.s. With the diodes 38 and 39 detecting the predetermined signal difference frequency, the tuned circuit 48 is actuated thereby to further amplify the difference frequency signal and further, to discriminate against other frequencies. The resulting signal is further amplified and substantially all remaining noise is integrated out. The signal is further amplified and applied to relay circuitry in the frequency signal difference detector 25 for actuating the ringing current generator 26, and ringer or buzzer 27 at field telephone 20.

In the communication system 90 embodiment, shown in FIGURE 3, the communication centers 91*a* and 91*b* are substantially mirror images of each other and that, therefore, the identifying numbers of one side will include the letter "*a*" and the numbers of the corresponding mirror image of the other side, the letter "*b*." The communication centers 91*a* and 91*b* are equipped with radio transmitter-receivers 13*a* and 13*b*, respectively, the equivalent of the FIGURE 1 transmitter-receivers 13 and 14. These centers 91*a* and 91*b* are connected to remotely located field telephones along with ringing current generators and ringers or buzzers located with the field telephones, as indicated by blocks 92*a* and 92*b*. The ringing current generator of each of these blocks may be actuated by a manually operated switch 22*a* or 22*b*, in the same manner as with the switch 22 of the FIGURE 1 embodiment, for activating the ringing current detectors 23*a* and 23*b*, respectively. The ringing current detectors 23*a* and 23*b* when actuated provide the signals for activating the two-tone frequency signal generators 93*a* and 93*b*, respectively. The two-tone frequency signal generators may each include two oscillators, of a conventional nature such as the oscillators 24*a* and 24*b* indicated in the embodiment of FIGURE 1, or may be any of many generally available systems for providing multiple tones. Ringing current detectors 23*a* and 23*b* are additionally provided with switch control outputs, as indicated by dotted lines 94*a* and 94*b*, for controlling switching elements of switching circuits 95*a* and 95*b*, respectively, for transmission of the outputs of the two-tone frequency signal generators 93*a* and 93*b* to the respective transmitter-receivers 13*a* and 13*b*, and for closing the audio line between the respective field telephone and the transmitter-receivers 13*a* and 13*b*. Whenever one of the two-tone frequency signal generators 93*a* and 93*b* is actuated and the two-tone frequency signals are modulated on a R.F. carrier and transmitted from the respective antenna 17*a* or 17*b* to the other, the signals received and demodulated are passed to the respective two-tone frequency signal difference detector 25*a* or 25*b*. Each two-tone frequency signal difference detector 25*a* or 25*b* is, substantially, the equivalent of the frequency signal difference detector 25 of the FIGURE 1 embodiment and functions in the same manner. The detectors 25*a* and 25*b* are, however, additionally provided with switch control outputs, as indicated by dotted lines 96*a* and 96*b*, for closing audio circuits and ringer or buzzer circuits of the remote field telephone being rung. Relay 81 is also connected to ringing current generators 26*a* and 26*b* just as the frequency signal difference detector 25 is connected to the difference detector 26 of the embodiment of FIGURE 1.

In the embodiment of FIGURE 4 some components, similar to the components of FIGURE 1, are for the sake of convenience, numbered the same. The communication system 100 of FIGURE 4 is shown to have two communication centers 11*a* and 12*a*, equipped with radio transmitter-receivers 13 and 14, respectively. Field telephone 15, remotely located from communication center 11*a*, is connected through audio line 16*a* to transmitter-receiver 13. R.F. signals are transmitted and received between antenna 17 of communication center 11*a* and antenna 18 of communication center 12*a*. Audio lines 19′, 19″, and 19‴ connect dispersed remotely located field telephones 20′, 20″, and 20‴, respectively, for transmission of audio signals between the field telephones and transmitter-receiver 14.

The communication system 100 is provided with a selectively operated automatic ring thru system having many features in common with the automatic ring thru system of FIGURE 1. However, the FIGURE 4 embodiment does provide for selectively ringing various remotely located field telephones of another communication center rather than just one telephone of the other center, as in FIGURE 1. With this embodiment, just as with the embodiment of FIGURE 1, a ringing current generator 21, having a manually operated switch 22, is located with field telephone 15. The ringing current generator 21 is connected to a ringing current detector, comparable to the ringing current detector 23 of FIGURE 1, which is combined with a switch control. The combined ringing current detector and switch control 101 is provided with an off-position 102 and with switch contacts 103′, 103″, and 103‴ for selectively closing circuits to, and activation of, the respective two-tone frequency signal generators 104′, 104″, or 104‴.

It should be noted that the ringer current detector and switch control 101 and the two-tone frequency signal generators 104′, 104″, and 104‴ may be remotely located with the ringer current generators and the field telephone as shown, or may, for that matter, be located along with the two-tone frequency signal generators in the communication center 11*a*. If control 101 is located with field telephone 15, it would be set by the user of the field telephone, and if, on the other hand, it is located in the communiaction center 11*a*, it would be set by an operator at the center, as requested by the user of the remotely located field telephone 15. In this embodiment the two-tone frequency signal generators, just as with the two-tone frequency signal generators 93*a* and 93*b* of FIGURE 3, may each include two oscillators, of conventional nature, such as the oscillators 24*a* and 24*b*, indicated in the embodiment of FIGURE 1, or may be any of the many generally available systems for providing multiple tones.

The two signal tones, out of an activated two-tone frequency signal generator 104′, 104″, or 104‴, are modulated on an R.F. frequency in transmitter-receiver 13, transmitted by antenna 17, and, when received by antenna 18, the two tone signals are demodulated in transmitter-receiver 14. The demodulated signals of the activated two-tone frequency signal generator are fed as two tone inputs to the two-tone frequency signal difference detectors 25′, 25″, and 25‴. Each of these two-tone frequency signal difference detectors is, substantially, the equivalent of the difference detector 25 of FIGURE 1, and each is set to respond to the frequency tones of a two-tone frequency signal generator, and particularly to the two tone difference of the corresponding two-tone frequency signal generator 104′, 104″, or 104‴. For example, the two-tone frequency signal generator 104′ could be set to provide audio frequency tones of 1090 c.p.s. and 1200 c.p.s., and the two-tone frequency signal difference detector 25′ would be set to respond to the two tone difference frequency signal of 110 c.p.s. The two-tone frequency signal generator 104″ could be set to provide audio frequency tones of 1090 c.p.s. and 1230 c.p.s., and two-tone frequency signal difference detector 25″ would be set to detect, and respond to, the difference frequency 140 c.p.s. The two-tone frequency signal generator 104‴ could be set to provide audio frequency tones 1090 c.p.s. and1260 c.p.s. and two-tone frequency signal difference detector 25‴ would be set to detect, and respond to, the difference frequency of 170 c.p.s. The two-tone frequency signal difference detectors 25′, 25″, and 25‴ have output connections with respective ringing current generators 26′, 26″, and 26‴. The ringing current generators are connected to ringers or buzzers 27′, 27″, and 27‴, respectively, located at the various respective field telephones 20′, 20″, and 20‴, and whenever a ringing current generator is activated by its two-tone frequency signal difference detector, the signal is provided for activating the respective ringer or buzzer at its remotely loacted field telephone.

Obviously, those skilled in the art could take the multiple two-tone frequency signal generator and two-tone frequency signal difference detector ring thru system for selectively ringing or buzzing various remotely located field telephones of the FIGURE 4 embodiment and incorporate such a system into a two-way ring thru communication system as set forth in the FIGURE 3 embodiment. Field telephones of one communication center could, in like fashion, be arranged to selectively ring telephones connected to the same center, and for corresponding ringing of telephones remotely located from several other different communication centers. All of this may be accomplished with a ring thru system incorporating two-tone frequency signal detectors each for detecting a known difference frequency between two audio tones originating from a specific two-tone frequency signal generator activated by an operator. Further, the ring thru system includes a difference frequency signal detecting device that guards against speech and other noises present in the output of a radio receiver. The detectors employ a high-pass signal input filter guarding against frequencies close to the known difference frequency and, within each detector, a known predetermined frequency difference signal between two frequencies passed by the filter is detected, and a circuit tuned to the frequency difference is activated. The resulting frequency difference signal is amplified and rectified, and it should be noted, that those frequencies remaining at the level initially passed by the high-pass filter are shorted to ground through a capacitor having a low impedance to such frequencies. Although the ring thru systems of the various embodiments have been described with reference to tones within the audio frequency range, the same principle would also be applicable to higher frequencies and known frequency differences selectively predetermined for controlled ring thru systems.

Whereas this invention is here illustrated and described with respect to several specific embodiments thereof, it should be realized that various changes may be made without departing from the essential contribution to the art made by the teachings hereof.

We claim:

1. An automatic ring thru system for communication networks actuated by an operator on a first telephone remotely located from a communication center for automatically ringing another operator on a second remotely located telephone including: operator actuated means; two frequency signal generating means connected to said operator actuated means; signal transmission means; means connecting said first telephone to said signal transmission means, and means connecting said second telephone to said signal transmission means for transmission of messages between said first and second telephones; a two frequency difference signal detector; said signal transmission means connected to said two frequency signal generating means and said detector, and providing a signal path for transmission of the frequencies generated by said two frequency signal generating means; and an attention attracting device located at said second remotely located telephone; means connecting said two frequency difference signal detector and said attention attracting device for activation of the attention attracting device when a predetermined two frequency difference is detected by the two frequency difference signal detector; said said two frequency difference signal detector being provided with a high-pass signal input filter having a low threshold frequency passing level above the frequency equal to the difference between the two frequencies.

2. The automatic ring thru system of claim 1, wherein said signal transmission means includes, radio frequency transmitting means; and RF receiving means; said first telephone being coupled to said transmitting means; said two frequency signal generating means being coupled to said transmitting means; said RF receiver being conected to said second telephone; and said RF receiver being coupled to said two frequency difference signal detector.

3. The automatic ring thru system of claim 1, wherein said two frequency signal generating means includes, a first oscillator for providing a frequency $f_1$; and a second oscillator for providing a frequency $f_2$; said two frequency difference signal detector being adjusted for detecting the difference between the two frequencies $f_1$ and $f_2$; and said difference signal detector being provided with a tuned circuit tuned to the frequency equal to the difference of frequencies $f_1$ and $f_2$.

4. The automatic ring thru system of claim 1, wherein said attention attracting device is a noise generator, subject to activation by a ringing current generator coupled to said frequency signal difference detector.

5. In a radio communication system including communication centers having telephones coupled to radio frequency equipment of the centers, and with audio signals between telephones subject to being modulated on RF carriers, transmitted and received, and to being demodulated from RF carriers received: a ring thru system including, means for producing a first frequency $f_1$ and a second frequency $f_2$ coupled to radio frequency equipment for modulation of the frequencies $f_1$ and $f_2$ on a radio frequency and transmission from a communication center; means for controlled actuation of said frequency producing means; frequency difference signal detecting means for detecting the difference between frequencies $f_1$ and$f_2$ demodulated from an RF signal in a communication center; attention attracting means at a telephone coupled to said frequency difference signal detector for actuation whenever frequencies $f_1$ and $f_2$ are applied to the difference signal detector; wherein said frequency difference signal detecting means includes, a signal input high-pass filter having a threshold frequency passing level below frequences $f_1$ and $f_2$; and said threshold frequency passing level of said high-pass filter being above the frequency equal to the difference between the two frequencies $f_1$ and $f_2$.

6. The radio communication system of claim 5, wherein said frequency producing means includes a first oscillator for providing a frequency $f_1$; and a second oscillator for providing a different frequency $f_2$.

7. The radio communication system of claim 6, wherein the frequency producing means includes a manually operated ringing current generator at a telephone, and a ringing current detector for activating said first and second oscillators.

8. The radio communication system of claim 5, wherein said frequency difference signal detecting means includes a frequency difference signal detecting circuit acting on signals passed by said high-pass filter and providing a frequency detected output equal to the difference between frequencies $f_1$ and $f_2$; and a capacitor connected between the output of the detector circuit and ground, of relatively low impedance to frequency signals above the threshold level of said high-pass filter.

9. The radio communication system of claim 8, wherein said frequency difference signal detecting means includes a tuned circuit tuned to the difference between frequencies $f_1$ and $f_2$ and subject to responsive activation by the detected frequency difference signal between frequencies $f_1$ and $f_2$.

10. The radio communication system of claim 8, wherein said frequency difference signal detecting means includes detected signal amplifying means; signal responsive means; said signal responsive means including a ringing current generator coupled between said frequency difference signal detecting means and said attention attracting means; and said attention attracting means comprising a buzzer.

11. The radio communication system of claim 5, wherein the radio frequency equipment of various individual communication centers has RF transmitting and RF receiving capabilities.

12. The radio communication system of claim 5, wherein said frequency producing means is capable of producing predetermined pairs of frequencies for different distinct frequency difference signals; several frequency difference signal detecting means tuned to and responsive to different distinct frequency difference signals, respectively; each of said several frequency difference signal detecting means connected to separate distinct telephones; and means selectively activating said frequency producing means for producing frequencies by predetermined pairs of frequencies selectively, and selective activation of attention attracting means of respective telephones, as desired.

References Cited by the Examiner

UNITED STATES PATENTS

| | | | |
|---|---|---|---|
| 1,476,003 | 12/23 | Martin | 179—84 |
| 1,688,452 | 10/28 | Demarest et al. | 179—41 |
| 2,572,074 | 10/51 | Terry et al. | 179—84 |
| 2,763,726 | 9/56 | Weller | 179—84 |
| 3,090,838 | 5/63 | Coates et al. | 179—84 |

ROBERT H. ROSE, *Primary Examiner.*

WILLIAM C. COOPER, *Examiner.*